(12) United States Patent
Hill et al.

(10) Patent No.: US 7,329,349 B2
(45) Date of Patent: Feb. 12, 2008

(54) WATER TREATMENT

(75) Inventors: David Douglas Hill, Mississauga (CA); Alan George Seech, Mississauga (CA); Kerry W. Bolanos-Shaw, Brampton (CA); Evica Dmitrovic, Mississauga (CA)

(73) Assignee: Adventus Intellectual Property Inc., Mississauga, Ontario (CA)

( * ) Notice: Subject to any disclaimer, the term of this patent is extended or adjusted under 35 U.S.C. 154(b) by 264 days.

(21) Appl. No.: 11/103,125

(22) Filed: Apr. 11, 2005

(65) Prior Publication Data

US 2006/0226068 A1    Oct. 12, 2006

(51) Int. Cl.
*C02F 3/00* (2006.01)

(52) U.S. Cl. ...................................... 210/610; 210/611

(58) Field of Classification Search ......... 210/610–611
See application file for complete search history.

(56) References Cited

U.S. PATENT DOCUMENTS

| | | | |
|---|---|---|---|
| 4,160,724 A | 7/1979 | Laughton | |
| 4,179,374 A | 12/1979 | Savage et al. | |
| 4,374,730 A | 2/1983 | Braha et al. | |
| 5,288,407 A | 2/1994 | Bodwell et al. | |
| 5,318,699 A | 6/1994 | Robertson et al. | |
| 5,330,651 A | 7/1994 | Robertson et al. | |
| 5,342,522 A | 8/1994 | Marsman et al. | |
| 5,482,630 A | 1/1996 | Lee et al. | |
| 5,520,812 A | 5/1996 | Ryhiner et al. | |
| 5,556,536 A | 9/1996 | Turk | |
| 5,676,828 A | 10/1997 | Kallenbach et al. | |
| 6,485,646 B1 * | 11/2002 | Dijkman et al. | 210/610 |

* cited by examiner

Primary Examiner—Chester T. Barry
(74) Attorney, Agent, or Firm—Paul E Schaaffsma; NovusIP, LLC

(57) ABSTRACT

In accordance with the principles of the present invention, methods and apparatuses are provided for practically complete removal of one or more electron acceptors (excluding oxygen) from waters of various origins, while ensuring that an added excess of external carbon is also practically completely removed using biological treatment. A method applies to waters that contain the target electron acceptor and a deficiency of carbon. One application of this method is the practically complete removal of nitrate from domestic wastewater (septic wastewater) while practically completely removing the added excess of external carbon, thus practically eliminating any increase of the biological oxygen demand of the water. Another method applies to waters that contain constituents that are potentially convertible to the target electron acceptor and may contain original carbon. One example of this method is aerobic pre-treatment of a water to yield nitrate and a deficiency of carbon, resulting in a water amenable to treatment via the previous method.

45 Claims, 8 Drawing Sheets

WATER TREATMENT

FIELD OF THE INVENTION

The present invention relates to methods and apparatuses for biological treatment of waters.

BACKGROUND OF THE INVENTION

In the biological treatment of water, microorganisms derive energy from an electron donor by facilitating the transfer of an electron to an electron acceptor. As used herein, an electron donor is a source of food that is often comprised of a carbon source and an electron acceptor is often dissolved oxygen, but can also be nitrate, sulfate, perchlorate, or many other compounds. During groundwater remediation, the perchlorate ion is of concern due to its potential human health effects. It is desirable to remove perchlorate from groundwater and drinking water. It is also of benefit to remove perchlorate from water without significantly increasing the biological oxygen demand (BOD) of the water.

In the field of septic wastewater treatment, there has been growing concern about the release of nitrate into the environment due to its linkage to methaemoglobinaemia, a condition where most typically babies do not utilize oxygen properly. Septic wastewater will often contain high BOD due primarily to biodegradable carbon. Septic wastewater will also often contain high nitrogen, including reduced and oxidized forms. To treat this wastewater, aerobic biological treatment is often performed, where oxygen is added to the water and microorganisms consume the carbon to decrease the BOD. Through this aerobic process, reduced forms of nitrogen, such as in ammonia or ammonium, will be transformed to oxidized states, with a typical endpoint of nitrate; this process is called nitrification.

After nitrification, the nitrate requires removal. Nitrate acts as an electron acceptor, but most of the electron donor (the carbon) has been removed during the aerobic treatment phase. Thus, an external carbon source may be required to reduce the nitrate. During this denitrification step, the nitrate is converted to nitrogen gas, which diffuses out of the water, thus removing nitrogen from the water; however, excess carbon may remain, which can lead to a high BOD value, which is normally considered itself to be a pollutant.

Another approach typically used to reduce nitrate is to use the carbon that is already present in the wastewater as the carbon source. This approach normally involves two treatment zones: The first treatment zone is a denitrification zone where carbon is consumed; the second treatment zone is a nitrification zone where oxygen is added and ammonia/ammonium is converted to nitrate. See, for example, U.S. Pat. No. 5,676,828 (an ammonification and denitrification reactor is coupled with a nitrification reactor, where ammonification is the process of creating ammonia/ammonium, and the final effluent comes from the ammonification and denitrification reactor). The effluent from the second or nitrification treatment zone is recycled, or looped back, to the first or denitrification zone such that the denitrification zone is receiving both nitrified water and raw water containing the carbon. A portion of either the nitrification or denitrification zones can be discharged as effluent. This treatment method is advantageous because an external carbon source is not required; however, this treatment method is not capable of achieving very low levels of both nitrogen and carbon because the final effluent is either coming from the denitrification zone—which contains ammonia/ammonium that may be later converted to nitrate in the environment—or the final effluent comes from the nitrification zone—which contains some nitrate.

Another approach adds an external carbon source. This approach involves the excavation of soil by digging a substantial trench in a target area to a depth below the water table for that location, filling that trench with a body of organic carbon such as wood chips, and thereafter covering the excavated area with layered porous material such as sand or gravel. See, for example, U.S. Pat. No. 5,318,699 (Robertson et al.) (construction of a soak away structure and installing a large body of organic carbon below a septic tank system). The large body of organic carbon provides both a carbon source and a location for growth of microorganisms required to breakdown the contaminants. Sufficient carbon is provided in the large body to last for several decades or longer; however, one of the problems with this system is that it does not control the amount of carbon available for denitrification. The system may release too much carbon in the effluent, which is itself often considered a pollutant, and is thus an undesirable effect.

In another approach involving an external carbon source a tank is constructed or installed downstream from a reservoir used to collect agricultural run-off. See, for example, U.S. Pat. No. 5,330,651 (Robertson et al.). The tank is filled with a substantial amount of organic carbon such as wood chips or sawdust. This approach requires that the contaminated water must remain in contact with treatment material in the tank for a substantial residence time to ensure breakdown of the contaminants. Again, there is the potential for an excess of carbon to be released.

In another approach phospohorus, carbon, and nitrogen are treated in two primary modes. See, for example, U.S. Pat. No. 5,342,522 (Marsman et al.). The first mode is plug flow where carbon and phosphorus removal occurs in a first step, followed by nitrification in a second step, and denitrification using an added carbon source is used in a third step. The added carbon may be from the sludge of the first step or may be an external carbon source. This approach requires perfect matching of added carbon and nitrate, which is difficult to perform, and may lead to significant levels of either carbon or nitrate in the effluent. In the second mode denitrification is followed by a nitrification step used in combination with recycling between stages; however, this is subject to the limitations previously discussed regarding trying to achieve very low levels of nitrogen.

Another approach uses the measurement of oxidation reduction potential (ORP) to optimize the addition of external carbon (for example, methanol) for the removal of nitrate. See, for example, U.S. Pat. No. 5,556,536 (Turk) and U.S. Pat. No. 5,482,630 (Lee et al.). The goal of this approach is similar to the goal of the present invention—to achieve very low levels of carbon and nitrate; however, this method may require careful monitoring to achieve very low levels of both nitrate and carbon.

Further approaches include U.S. Pat. No. 5,520,812 (Ryhiner et al.), who describes a two-region system with recycling and adds partial oxygenation of the denitrification region; U.S. Pat. No. 5,288,407 (Bodwell et al.), who describes a system involving two tricking filters with recycling to reduce carbon and to nitrify and a separate denitrification media for the denitrification portion, suggesting the use of a sulfur-limestone media; and U.S. Pat. No. 4,374,730 (Braha et al.); U.S. Pat. No. 4,179,374 (Savage et al.); and U.S. Pat. No. 4,160,724 (Laughton), who involve some form of recycling between denitrification and nitrification zones.

What would thus be desirable is provide a water treatment method and apparatus for practically complete removal of electron acceptors (excluding oxygen) from waters of various origins, while ensuring that an added excess of external carbon source is also practically completely removed. It would be further desirable to provide a water treatment method and apparatus that allows for a margin of error in setting the carbon addition rate. It would be further desirable to provide a water treatment method and apparatus capable of achieving very low levels of the target electron acceptor(s) and constituents that are potentially convertible to the target electron acceptor(s), and an added external carbon source.

SUMMARY OF THE INVENTION

A water treatment method and apparatus in accordance with the principles of the present invention achieves practically complete removal of electron acceptors (excluding oxygen) from waters of various origins, while ensuring that an added excess of external carbon source is also practically completely removed. A water treatment method and apparatus in accordance with the principles of the present invention allows for a margin of error in setting the carbon addition rate. A water treatment method and apparatus in accordance with the principles of the present invention is capable of achieving very low levels of the target electron acceptor(s) and constituents that are potentially convertible to the target electron acceptor(s), and an added external carbon source.

In accordance with the principles of the present invention, methods and apparatuses are provided for practically complete removal of one or more electron acceptors (excluding oxygen) from waters of various origins, while ensuring that an added excess of external carbon is also practically completely removed using biological treatment. A first method applies to waters that contain the target electron acceptor and a deficiency of carbon. One application of this method is the practically complete removal of nitrate from domestic wastewater (septic wastewater) while practically completely removing the added excess of external carbon, thus practically eliminating any increase of the biological oxygen demand of the water. Another method applies to waters that contain constituents that are potentially convertible to the target electron acceptor and may contain original carbon. One example of this method is aerobic pre-treatment of a water to yield nitrate and a deficiency of carbon, resulting in water amenable to treatment via the previous method.

DETAILED DESCRIPTION OF THE PREFERRED EMBODIMENT

Figure 1:
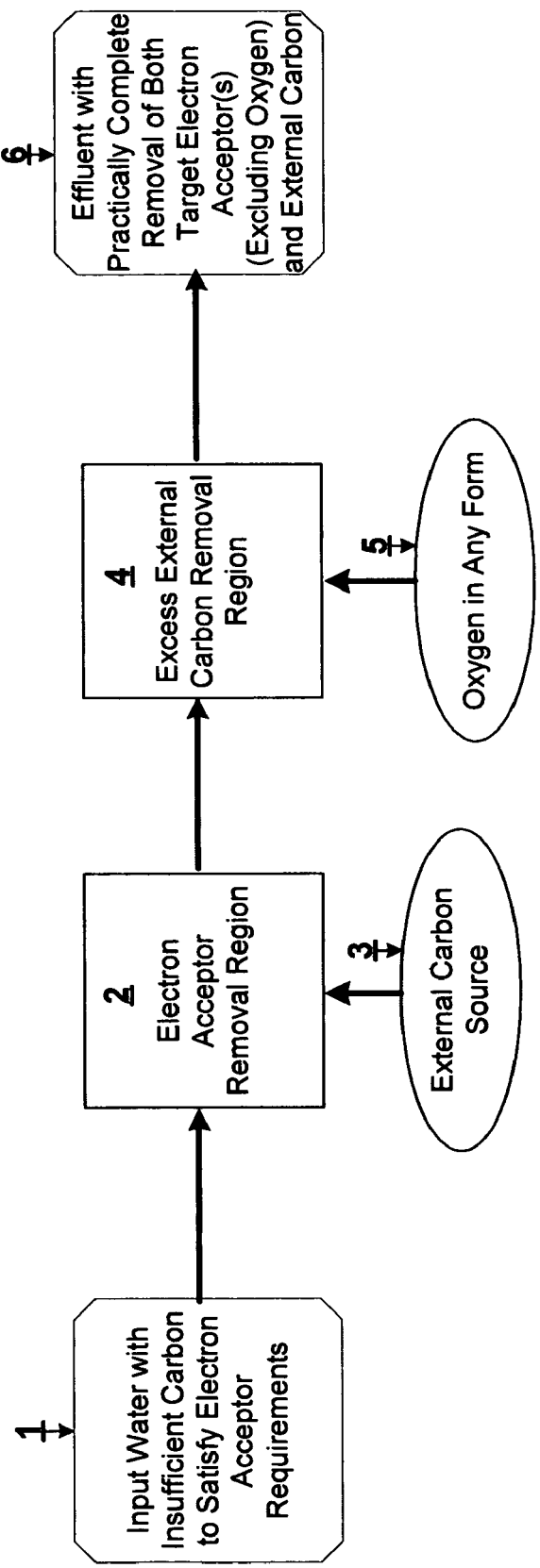
FIG. 1 is a schematic of a method in accordance with the principles of the present invention.

Although methods and apparatuses in accordance with the principles of the present invention are primarily directed to the field of removal of nitrate from wastewater, the principles of the present invention apply to perchlorate, sulfate, ferric iron, and other electron acceptors, with the exception of oxygen, and shall be herein referred to as the target electron acceptors. The conversion of electron acceptors to other forms will be referred to as 'removal' of the compound.

In accordance with the principles of the present invention, methods and apparatuses are provided for practically complete removal of electron acceptors (excluding oxygen) from waters of various origins, while ensuring that an added excess of external carbon source is also practically completely removed. The method comprises the addition of an excess of an external carbon source into a first biological treatment region where practically complete removal of the target electron acceptor(s) occurs, followed by nearly complete removal of any excess external carbon in a second biological treatment region that is oxygenated in some manner to yield a final water composition. The effluent from the second biological treatment region is practically void of both the target electron acceptor(s) and external carbon. This can be accomplished using any type of biological treatment.

While the methods and apparatuses of the present invention do not require the use of any particular type of biological treatment, in one embodiment fixed-film biological treatment can be used for some of the components, where a submerged inorganic biocarrier can be used to support microbial growth. The methods and apparatuses of the present invention may be used to remove electron acceptors from various sources of water, including but not limited to ground water, domestic wastewater (including septic wastewater), industrial wastewater, and drinking water (although further treatment would be required after the use of the present invention for drinking water). The electron acceptors are generally considered to be a pollutant, while in some cases the added carbon source may also be considered a pollutant; thus, there is a strong need for practically completely removing both parts.

A first method in accordance with the principles of the present invention adds an excess of external carbon to carbon-deficient water, and using any type of biological treatment such that the microorganisms in the apparatus will simultaneously consume or convert the carbon source and the target electron acceptor(s) to other end products. The external carbon source can be added in excess of the amount required to practically completely remove the target electron acceptor(s). A second region of any type of biological treatment is provided where excess oxygen in some form is added to the water to allow microorganisms to consume the remaining external carbon. The end result is water that contains practically no target electron acceptor(s) and practically no external carbon. The reason that oxygen is excluded from complete removal is that the addition of an excess of oxygen is required to ensure the external carbon is practically completely removed.

An example of an application of the first method in accordance with the present invention is the removal of nitrate from septic wastewater that is, or has been caused to be, deficient in carbon. An external carbon source, such as methanol or a carbohydrate for example, can be added in excess to the water, and microorganisms in a first region of biological treatment consume practically all the nitrate. The water then moves through a second region of biological treatment where air can be injected into the water to dissolve oxygen into the water. The oxygen serves as an electron acceptor, and the microorganisms practically completely remove any excess external carbon, yielding water that contains practically no nitrate and practically no external carbon. Another example of an application of the first method in accordance with the principles of the present invention is the treatment of perchlorate from groundwater, as the perchlorate will act as an electron acceptor.

Another method in accordance with the principles of the present invention involves a pre-treatment step that uses any type of aerobic biological treatment of water that contains constituents that may potentially be converted to the target electron acceptor(s). This process will also remove original carbon that may be present in the water. The effluent from this step then goes on to the remainder of the steps of the method, which comprise the steps of the first method since the water will contain the target electron acceptor(s) and a deficiency of carbon to remove the electron acceptor(s).

An example of an application of this method in accordance with the present invention is aerobic pre-treatment of domestic wastewater after treatment in a septic tank. This water contains high original organic carbon, which can be removed in the aerobic pretreatment step, and high ammonia/ammonium, which can be converted primarily to nitrate. This water can then proceed with the remainder of the treatment method where excess external carbon can be added to practically completely remove the nitrate, and then the excess external carbon can also be practically completely removed.

A further example of an application of the previous method in accordance with the present invention applies to influent waters that also contain settle-able solids. In this case, a septic tank can be used to remove settle-able solids from a domestic wastewater that also contains high levels of original organic carbon and ammonia/ammonium. The original carbon can then be removed using an aerobic treatment process, and the ammonia/ammonium can be oxidized to nitrate. The nitrate can subsequently be removed using biological treatment with the addition of an excess of external carbon, and the excess external carbon can be removed in the excess external carbon removal region.

The biological treatment may consist of but is not limited to activated sludge processes, trickling filters, rotating biological contactors, sequencing batch reactors, fixed-film reactors, fluidized bed reactors, any other type of biological treatment processes or equipment, or any combination of the processes or equipment mentioned. Many types of water and wastewater treatment technologies may be added to the treatment process as described herein.

Further variations of these two main methods are described below where other processes can be added.

Referring to FIG. 1, a schematic of a method in accordance with the principles of the present invention is seen. Input water with insufficient carbon to satisfy electron acceptor requirements 1 enters an electron acceptor removal region 2 and an external carbon source 3 is added to the water within or upstream of the electron acceptor removal region 2. After practically complete removal of the electron acceptor is accomplished, the water is transferred to the excess external carbon removal region 4. Oxygen in any form 5 is added to the water either within the excess external carbon removal region 4, or between the electron acceptor removal region 2 and the excess external carbon removal region 4. The excess external carbon 3 is practically completely removed prior to the water becoming effluent with practically complete removal of both target electron acceptor(s) (excluding oxygen) and external carbon 6.

Figure 2:
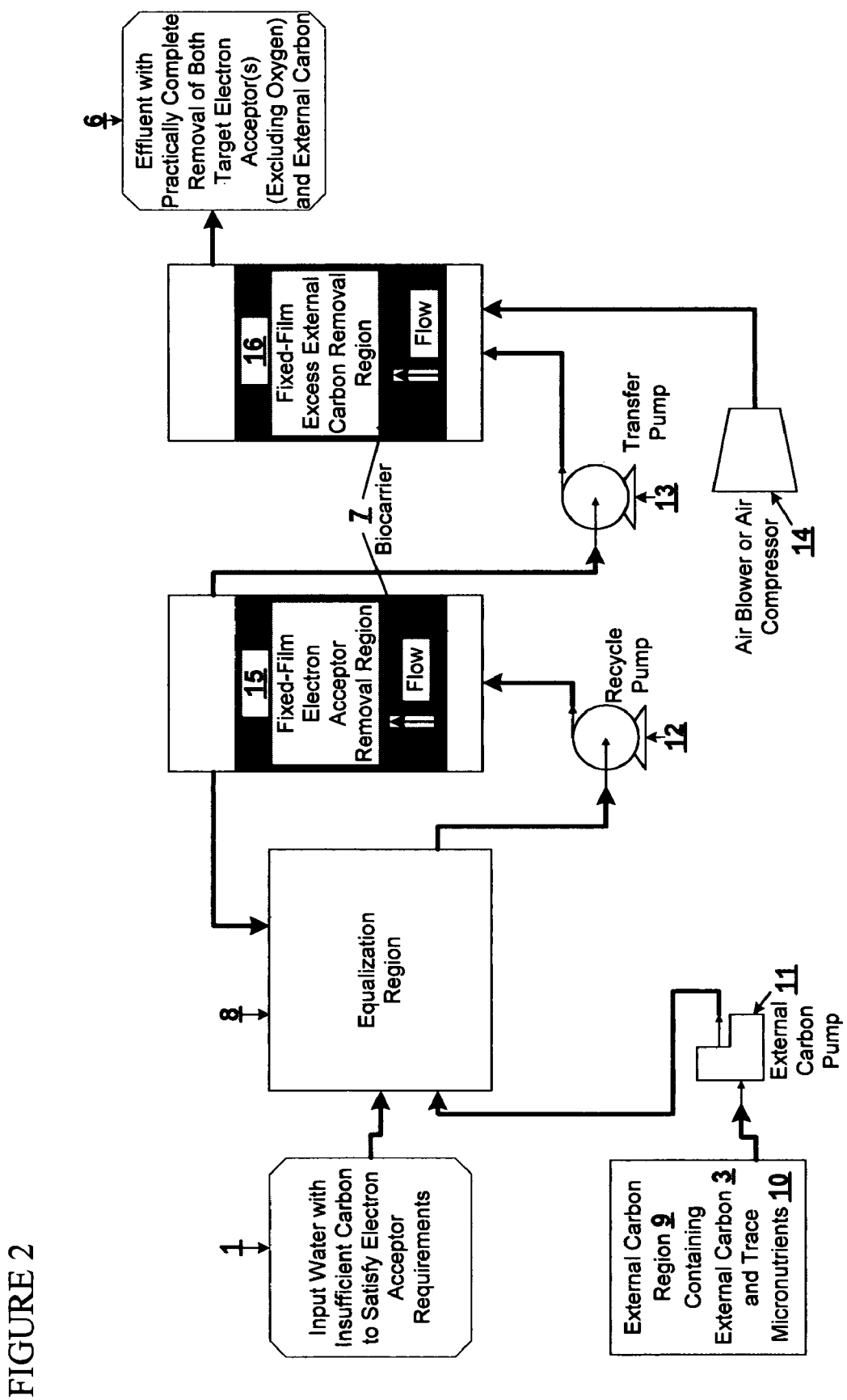
FIG. 2 is a process flow diagram of an embodiment of the method of FIG. 1.

FIG. 2 is a process flow diagram of a first embodiment of the method of FIG. 1. The input water that is insufficient in carbon to satisfy the electron acceptor requirements 1 enters an equalization region 8. External carbon 3 and trace micronutrients 10 can be pumped from an external carbon region 9 into the equalization region 8 using an external carbon pump 11. The external carbon source may be any of a large number of easily biodegradable carbon sources, such as for example methanol, a mixture of molasses and water, or liquid carbohydrates.

A recycle pump 12 pumps water from the equalization region 8 into the bottom of a fixed-film electron acceptor removal region 15. A transfer pump 13 transfers water from the fixed-film electron acceptor removal region 15 to a fixed-film excess external carbon removal region 16. The recycle pump 12 pumps water from the equalization region 8 into the bottom of the fixed-film electron acceptor removal region 15 at a flow rate that can be greater than the rate the transfer pump transfers water from the fixed-film electron acceptor removal region 15 to the fixed-film excess external carbon removal region 16.

An air blower or air compressor 14 adds air to the fixed-film excess external carbon removal region 16 to provide oxygen to the water. The excess flow from the recycle pump 12 returns to the equalization region 8. Both the electron acceptor removal region 15 and the fixed-film excess external carbon removal region 16 can contain a biocarrier 7, which can support the growth of the microorganisms. Effluent with practically complete removal of both the target electron acceptor(s) (excluding oxygen) and external carbon 6 exits the fixed-film excess external carbon removal region 16, via gravity.

Preferably, the biocarrier provides a location for microorganisms to grow on and within. Preferably, the biocarrier provides protection for the microorganisms against transient increases in concentrations of constituents that may potentially be harmful to them. Preferably, the biocarrier may be a durable expanded clay material or a material that can be a durable composite material that includes aluminosilicate minerals and activated carbon or any other inorganic medium suitable for the growth of microorganisms.

The transfer pump should be set at a flow rate that can be equal to the maximum instantaneous flow rate that would be required to ensure that water does not back up in the system. The transfer pump may be controlled in various ways to turn it on and off, such as using a float switch in the equalization region to activate the pump when the water level reaches a given height.

A recycle pump may be used to recycle flow within either the electron acceptor removal tank (or region) and/or separately within the excess external carbon removal tank (or region). The recycle flow can typically be in an upwards direction such that the ratio of additional flow rate beyond the instantaneous flow rate being treated by the apparatus can be equivalent to about 0.5 to about 20 times the instantaneous flow rate, and can be ideally between about 2.5 times and about 5 times the instantaneous flow rate.

The equalization tank (or region) provides equalization of influent flow, and may provide a volume for recirculation of flow within the apparatus. The volume of the equalization tank may be between about 0.02 to about 5 times the average daily flow through the system, and ideally between about 0.1 and about 1 times the average daily flow.

Design criterion can be used to design the volume of the biocarrier. Two design criterion comprise the average hydraulic retention time (HRT), calculated as the average daily flow rate divided by the bulk volume of the biocarrier in the given tank (or region); and the instantaneous hydraulic retention time, calculated as the maximum instantaneous flow rate divided by the bulk volume of the biocarrier in the given tank (or region). The following ranges for these criteria can be used:

- an average HRT for the electron acceptor removal tank (or region) of between about 0.02 and about 48 hours, and more typically between about 0.25 and about 8 hours, depending on the concentration(s) and type(s) of electron acceptor(s) and other characteristics of the water such as constituents that will assist or hinder the activity of microorganisms;
- an instantaneous HRT for the electron acceptor removal tank (or region) equivalent to its average HRT divided by a value between about 1 and about 20, and more typically a value between about 1.5 and about 3;
- an average HRT for the excess external carbon removal tank (or region) of between about 0.02 and about 48 hours, and more typically between about 0.25 and about 8 hours, depending on the extent of excess carbon remaining in the water, and other characteristics of the water such as constituents that will assist or hinder the activity of microorganisms; and
- an instantaneous HRT for the excess external carbon removal tank (or region) equivalent to its average HRT divided by a value between about 1 and about 20, and more typically a value between about 1.5 and about 3.

As recognized by those skilled in the art, other design and operating criteria can be used.

The rate of aeration for the excess carbon removal tank (or region) can be between about 0.01 and about 100 cubic feet per minute (cfm) of air per U.S. gallon per minute (USGPM) of average daily water flow, and more typically can be between about 0.05 and about 20 cfm of air per USGPM of average daily water flow, and ideally can be between about 0.1 and about 5 cfm of air per USGPM of average daily water flow. The rate of aeration will depend also on the HRT. As the HRT increases, the volume of biocarrier required is larger, and thus the greater volume requires aeration, despite having the same average daily water flow. The dissolved oxygen concentration can be measured in the excess carbon removal region and should be at least about 3 mg/L, but if it is close to about 8 mg/L, then there should be sufficient dissolved oxygen in the water, as this is approximately the solubility limit of oxygen in water.

The initial external carbon concentration can be estimated by balancing the chemical reaction between the external carbon source and the electron acceptor(s). The concentration of the external carbon source required in the water can be approximately equal to the sum of the mass concentration of each electron acceptor multiplied by the mass ratio of the carbon source to the given electron acceptor. However, this only provides an initial estimate of the concentration required, as the concentrations of all constituents that will create a demand for the external carbon can be difficult to determine. The on-going concentration can be increased if the concentration of the electron acceptor(s) measured after the electron acceptor removal tank (or region) is in excess of the concentration desired. The on-going concentration can be decreased if the concentration of the excess carbon (or an indirect measure of the excess carbon such as the biological oxygen demand) measured after the excess carbon removal tank (or region) is in excess of the concentration desired.

One technique for determining the flow rate of the external carbon source is to link the carbon pump to the same controller that controls the transfer pump such that they can be operating at the same time. The carbon pump flow rate can then be proportional to the transfer pump at a factor that is appropriate for the concentration of the external carbon source.

It can sometimes be necessary to remove excess biomass growth from the treatment regions through the process of injecting air at a sufficient velocity to dislodge microorganisms from the biocarrier. This is termed 'air sparging'. The effluent at such times may be directed to a location that can handle water that contains a high level of suspended solids (primarily in the form of microorganisms). It may also be of benefit to provide trace micronutrients that may be missing in a given water to improve the health of microorganisms in the apparatus. The micronutrients can be added to the external carbon source on a regular basis to yield a relatively stable micronutrient concentration.

Figure 3:
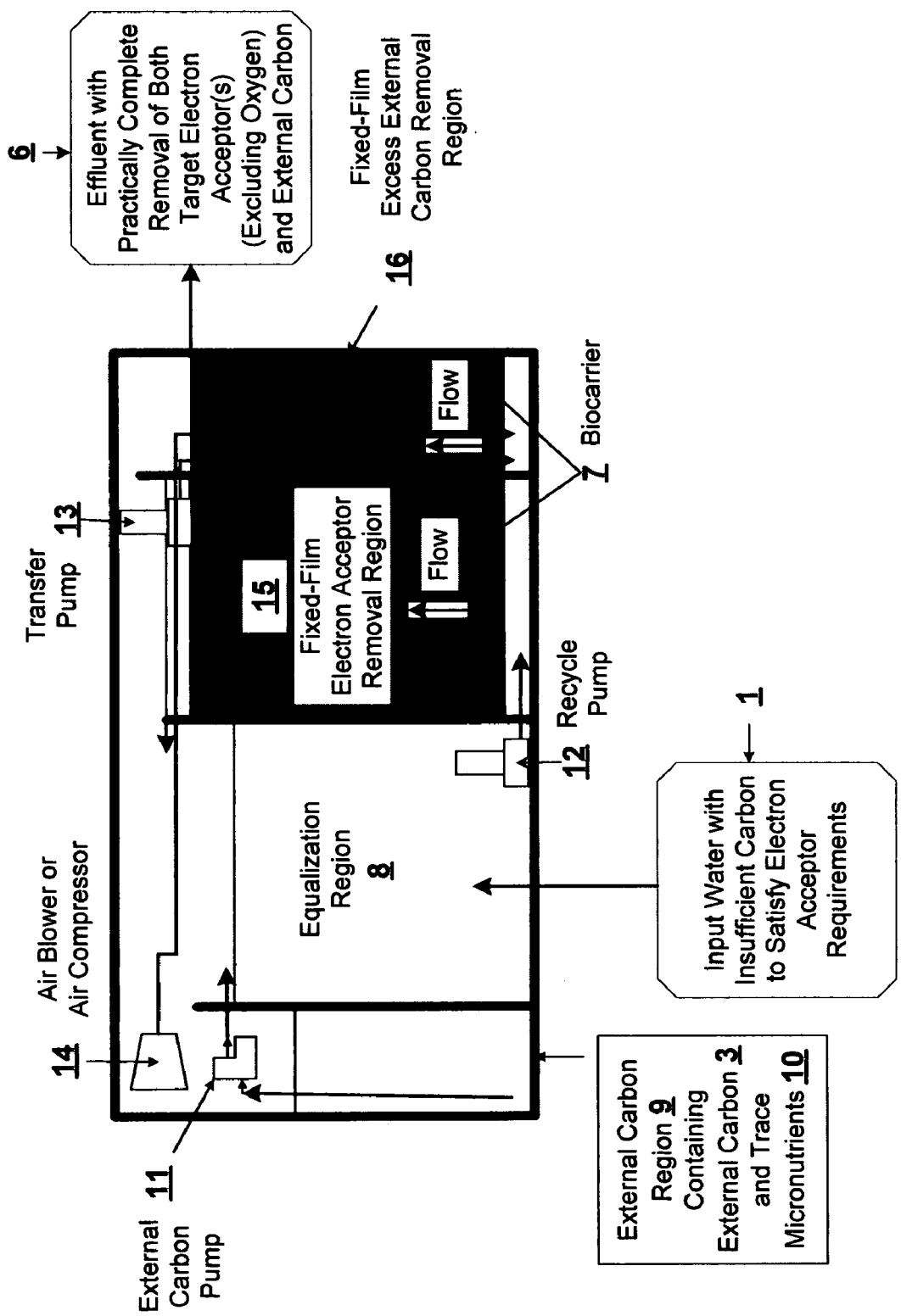
FIG. 3 is a process flow diagram of another embodiment of the method of FIG. 1.

FIG. 3 is a process flow diagram of another embodiment of the method of FIG. 1. The input water that is insufficient in carbon to satisfy the electron acceptor requirements 1 enters the equalization region 8. External carbon 3 and trace micronutrients 10 can be pumped from the external carbon region 9 into the equalization region 8 using the external carbon pump 11. A recycle pump 12 pumps water from the equalization region 8 into the bottom of the fixed-film electron acceptor removal region 15 at a flow rate that can be greater than the rate of the transfer pump 13, which transfers water from the fixed-film electron acceptor removal region 15 to the fixed-film excess external carbon removal region 16. An air blower or air compressor 14 adds air to the fixed-film excess external carbon removal region 16 to provide oxygen to the water. The excess flow from the recycle pump 12 returns to the equalization region 8. Both the fixed-film electron acceptor removal region 15 and the fixed-film excess external carbon removal region 16 can contain the biocarrier 7, which can support the growth of the microorganisms. Effluent with practically complete removal of both the target electron acceptor(s) (excluding oxygen) and external carbon 6 exits the fixed-film excess external carbon removal region 16 via gravity.

An example of a specific application of the method of FIG. 1 is the removal of nitrate from septic wastewater that is, or has been caused to be, deficient in carbon. An external carbon source, such as methanol or a carbohydrate for example, can be added in excess to the water and microorganisms in a first region of biological treatment consume practically all the nitrate. The water then moves through a second region of biological treatment where air can be injected into the water to dissolve oxygen into the water. The oxygen serves as an electron acceptor, and the microorganisms practically completely remove any excess external carbon, yielding water that contains practically no nitrate and practically no external carbon.

Another example of a specific application of the method of FIG. 1 is the treatment of perchlorate from groundwater. The perchlorate will act as an electron acceptor by microorganisms after more energy releasing electron acceptors such as oxygen are consumed. An excess of external carbon can be added to the electron acceptor removal region to ensure practically complete removal of perchlorate. The perchlorate can be reduced and the chlorine atoms of the perchlorate molecule are transformed to the chloride ion.

The excess external carbon region practically completely removes the excess external carbon.

Any number of apparatuses can be envisioned and constructed to accomplish the method in accordance with the principles of the present invention. The apparatuses described herein constitute examples, and not limitations, of how the method may be carried out.

Figure 4:
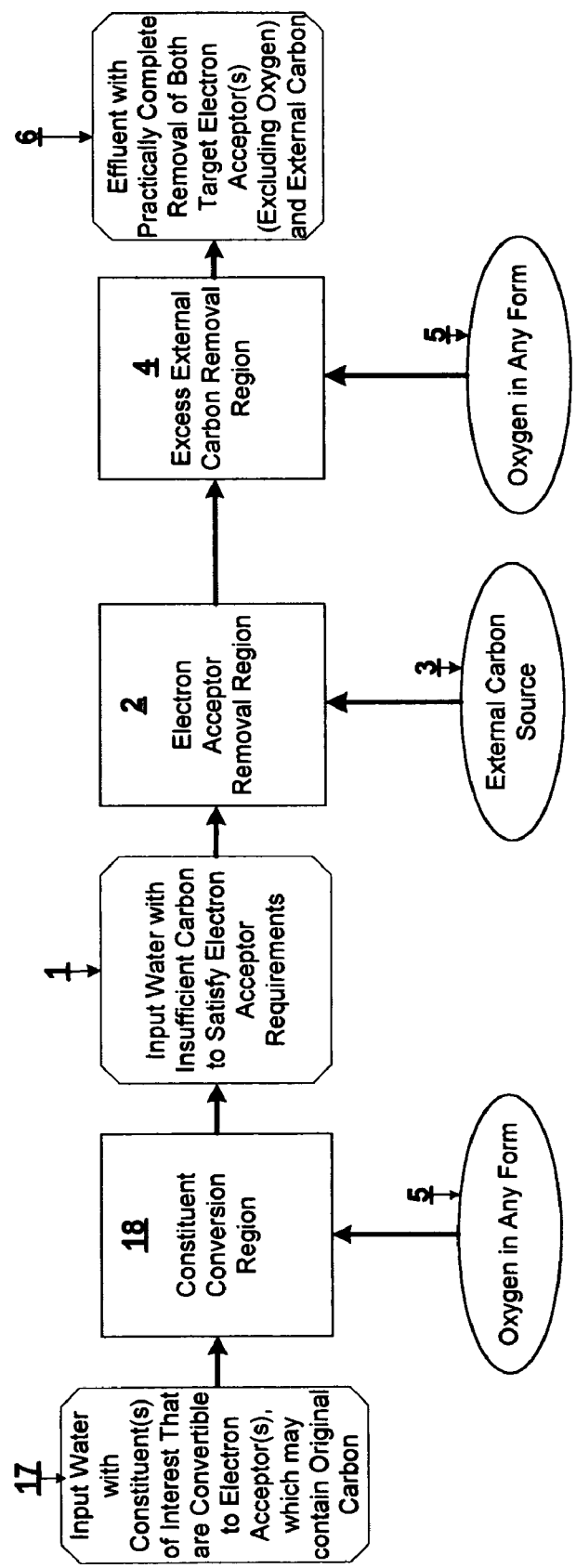
FIG. 4 is a schematic of another method in accordance with the principles of the present invention.

FIG. 4 is a schematic of another method in accordance with the principles of the present invention. The input water with constituent(s) that are convertible to electron acceptor(s)—which may contain original carbon 17—can now be the starting point. The conversion process requires an input of oxygen 5, which enriches water in a constituent conversion region 18 with oxygen. Typically any original carbon present in the water will be removed in this region, followed by the conversion of the constituent(s) to the target electron acceptor(s). The water from this process now becomes input water with insufficient carbon to satisfy electron acceptor requirements 1, which enters the electron acceptor removal region 2 and an external carbon source 3 is added to the water within or upstream of the electron acceptor removal region 2. After practically complete removal of the electron acceptor is accomplished, the water is transferred to an excess external carbon removal region 4. Oxygen in any form 5 is added to the water either within the excess external carbon removal region 4, or between the electron acceptor removal region 2 and the excess external carbon removal region 4. The excess external carbon can practically be completely removed prior to the water becoming effluent, with practically complete removal of both target electron acceptor(s) (excluding oxygen) and external carbon 6. The purpose of adding this pre-treatment step is that there can sometimes be constituents in various waters that require removal; however, they must first be converted to a suitable electron acceptor before they can effectively be removed.

Figure 5:
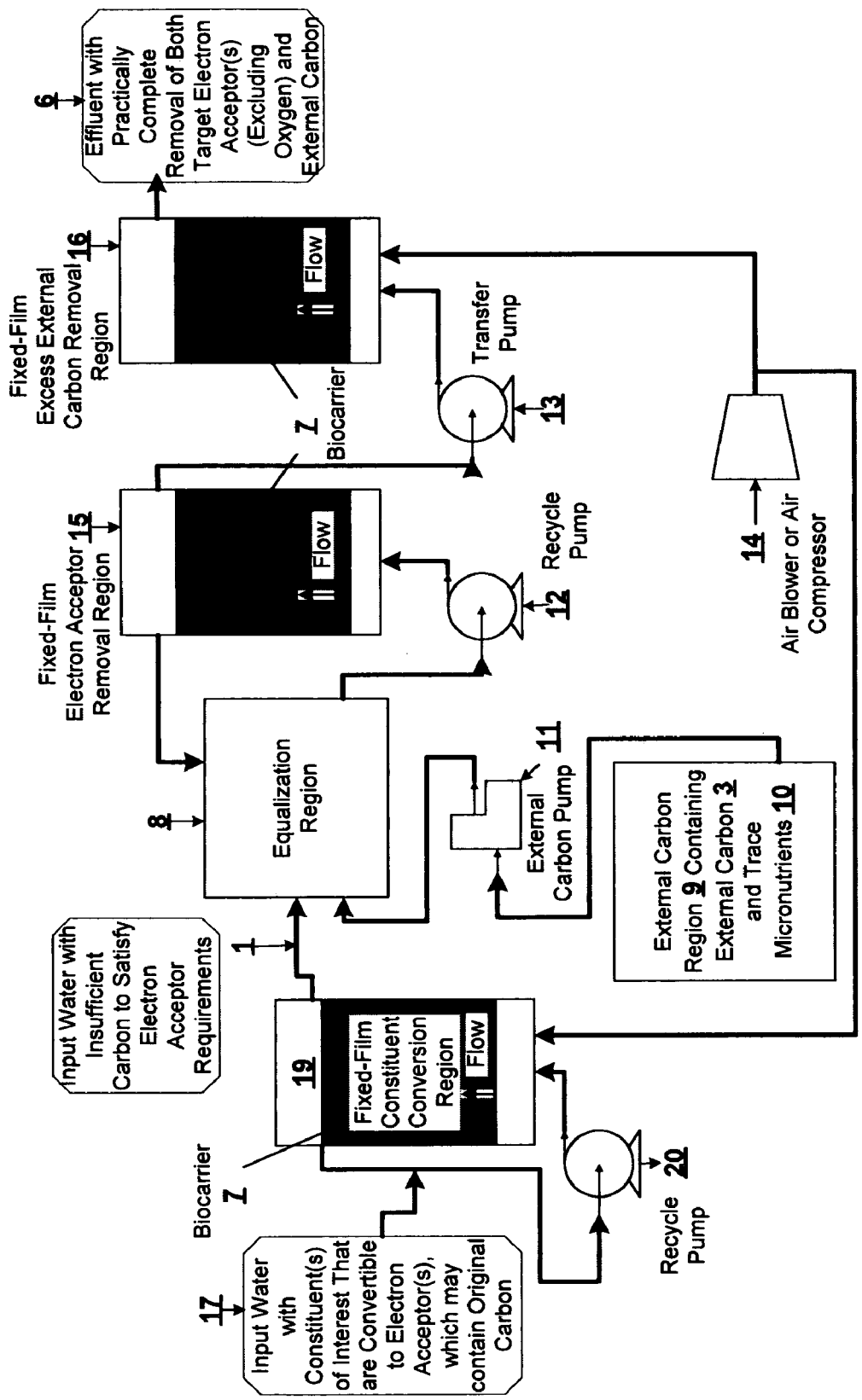
FIG. 5 is a process flow diagram of an embodiment of the method of FIG. 4.

FIG. 5 is a process flow diagram of an embodiment of the method of FIG. 4. Input water with constituent(s) that are convertible to electron acceptor(s)—which may contain original carbon 17—can be transferred to a fixed-film constituent conversion region 19, or to the intake line of a recycle pump 20 that can be used to recycle water within the first treatment region. The constituent(s) are converted to the target electron acceptor(s), and original carbon can be consumed, yielding input water with insufficient carbon to satisfy electron acceptor requirements 1. This water can be transferred to an equalization region 8, where external carbon 3 and trace micronutrients 10 can be pumped from the external carbon region 9 using the external carbon pump 11. A recycle pump 12 can be used to recirculate water between the equalization region 8 and the fixed-film electron acceptor removal region 15. Recycle flow returns to the equalization region 8, while a transfer pump 13 pumps the treated water from the fixed-film electron acceptor removal region 15 to the fixed-film excess external carbon removal region 16. The biocarrier 7 can be located in all three-treatment regions 19, 15, and 16. An air compressor or air blower 14 can be used to increase the dissolved oxygen concentration of treatment regions 19 and 16. Effluent with practically complete removal of both target electron acceptor(s) (excluding oxygen) and external carbon 6 can be produced from the fixed-film excess external carbon removal region 16.

Figure 6:
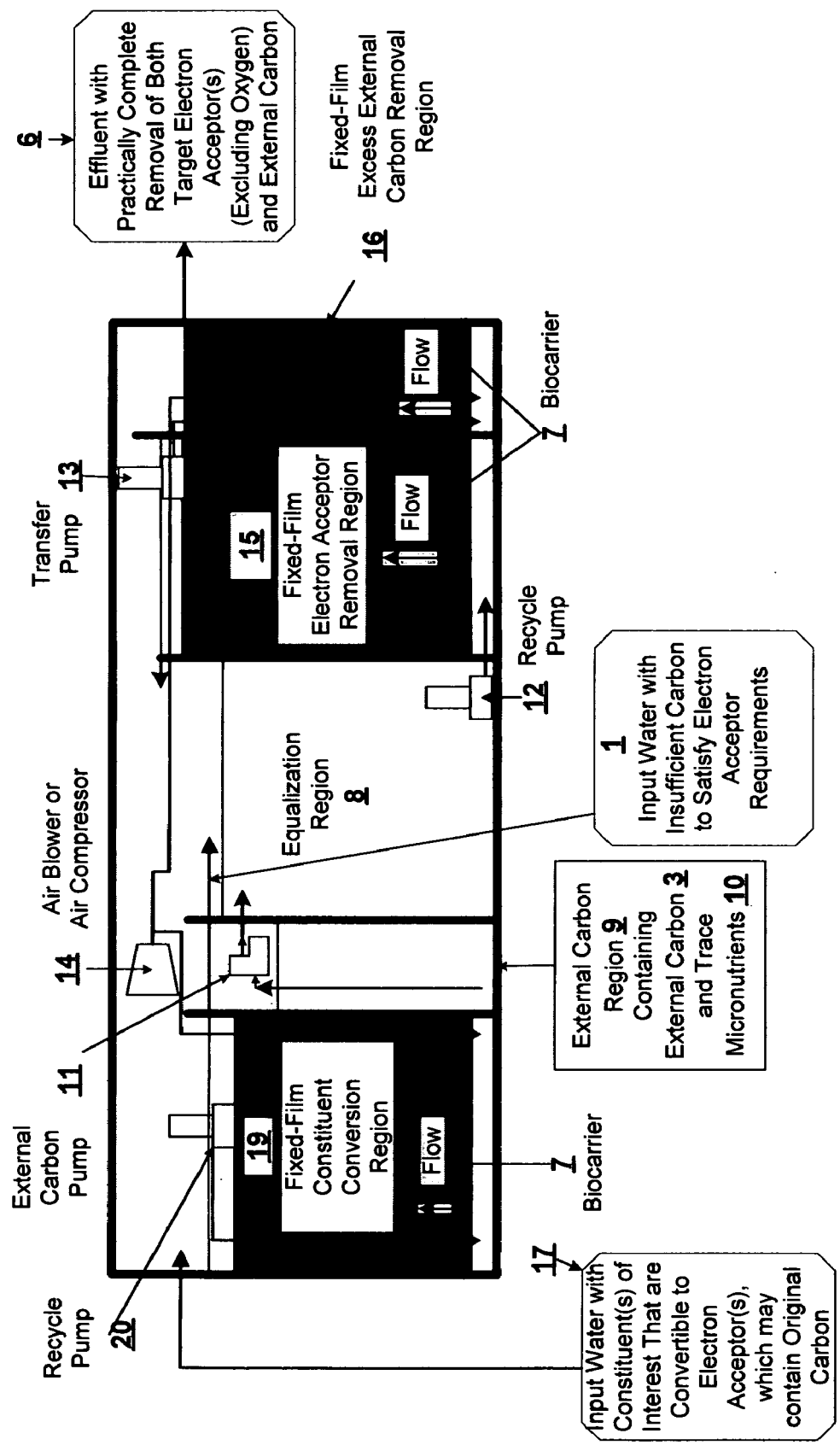
FIG. 6 is a process flow diagram of another embodiment of the method of FIG. 4.

FIG. 6 is a process flow diagram of another embodiment of the method of FIG. 4. Input water with constituent(s) that are convertible to electron acceptor(s)—which may contain original carbon 17—can be transferred to the fixed-film constituent conversion region 19, or to the intake line of the recycle pump 20 that can be used to recycle water within the first treatment region. The constituent(s) of interest are converted to the target electron acceptor(s), and original carbon can be consumed, yielding input water with insufficient carbon to satisfy electron acceptor requirements 1. This water can be transferred to an equalization region 8, where external carbon 3 and trace micronutrients 10 can be pumped from the external carbon region 9 using the external carbon pump 11. A recycle pump 12 can be used to recirculate water between the equalization region 8 and the fixed-film electron acceptor removal region 15. Recycle flow returns to the equalization region 8, while a transfer pump 13 pumps the treated water from the fixed-film electron acceptor removal region 15 to the fixed-film excess external carbon removal region 16. The biocarrier 7 can be located in all three-treatment regions 19, 15, and 16. An air compressor or air blower 14 can be used to increase the dissolved oxygen concentration of treatment regions 19 and 16. Effluent with practically complete removal of both target electron acceptor(s) (excluding oxygen) and external carbon 6 can be produced from the fixed-film excess external carbon removal region 16. The equalization region may be moved further upstream in the preferred embodiments, so that it can be used in conjunction with the constituent conversion region instead of the electron acceptor removal region.

Any number of apparatuses can be envisioned and constructed to accomplish the method in accordance with the principles of the present invention. The apparatuses described herein constitute examples, and not limitations, of how the method may be carried out.

An example of an application of the method of FIG. 4 is the treatment of domestic wastewater (or septic water) that has not undergone extensive pre-treatment, leaving a water that is high in original carbon, high in ammonia/ammonium and organically-bound nitrogen, and low in nitrate. Often both the carbon (as measured by BOD) and the nitrogen must be removed to a given set of effluent criteria Ammonia/ammonium and organically bound nitrogen are not easily directly removed from the water biologically. One method for dealing with this nitrogen is to convert it to primarily nitrate. This can be accomplished using aerobic biological treatment, such as in the first treatment stage of the method of FIG. 4. Prior to the conversion of ammonia/ammonium and organically bound nitrogen to nitrate, typically the original carbon in the water must first be removed. This can be accomplished in the first aerobic treatment step. Once the water has been treated in this first aerobic step, the water that remains is very low in original carbon, high in nitrate, and low in other forms of nitrogen. This water can now be amenable to treatment using the remainder of the treatment steps of this method, which comprise the treatment steps of the first method.

Another example of the use of the method of FIG. 4 is for the treatment of groundwater that is contaminated with ammonia/ammonium, but contains very little original carbon. The ammonia/ammonium can be converted to nitrate in the constituent conversion region. The nitrate can then be removed through the addition of an excess of external carbon in the electron acceptor removal region. The excess external carbon can then be removed in the last aerobic treatment step to yield water that is very low in ammonia/ammonium, nitrate, and external carbon.

Figure 7:
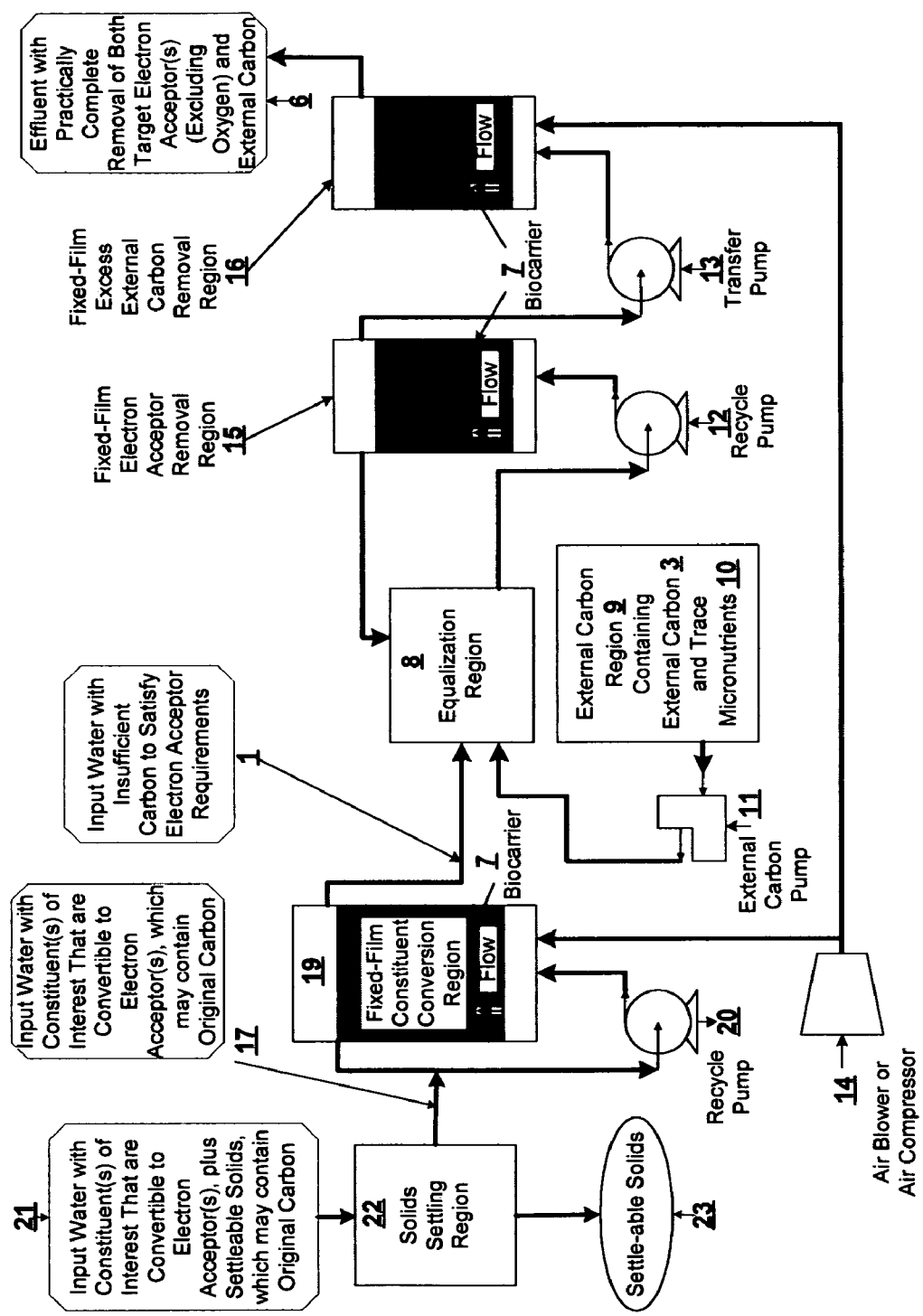
FIG. 7 is a process flow diagram of another embodiment of the method of FIG. 4.

FIG. 7 is a process flow diagram of another embodiment of the method of FIG. 4 where the input water also contains settle-able solids. The input water with constituent(s) of interest that are convertible to electron acceptor(s) plus settle-able solids—which may contain original carbon 21—enters the solids settling region 22. The settle-able solids 23 are settled and removed from the water. The product of this step is the input water with constituent(s) of interest that are convertible to electron acceptor(s)—which may contain original carbon 17—which can be transferred to the fixed-film constituent conversion region 19, or to the intake line of the recycle pump 20 that can be used to recycle water within the fixed-film constituent conversion region 19. The constituent(s) of interest are converted to the target electron acceptor(s), and original carbon can be consumed, yielding input water with insufficient carbon to satisfy electron acceptor requirements 1. This water can be transferred to an equalization region 8, where external carbon 3 and trace micronutrients 10 can be pumped from the external carbon region 9 using the external carbon pump 11. A recycle pump 12 can be used to recirculate water between the equalization region 8 and the fixed-film electron acceptor removal region 15. Recycle flow returns to the equalization region 8, while a transfer pump 13 pumps the treated water from the fixed-film electron acceptor removal region 15 to the fixed-film excess external carbon removal region 16. The biocarrier 7 can be located in all three-treatment regions 19, 15, and 16. An air compressor or air blower 14 can be used to increase the dissolved oxygen concentration of treatment regions 19 and 16. Effluent with practically complete removal of both target electron acceptor(s) (excluding oxygen) and external carbon 6 can be produced from the fixed-film excess external carbon removal region 16.

Figure 8:
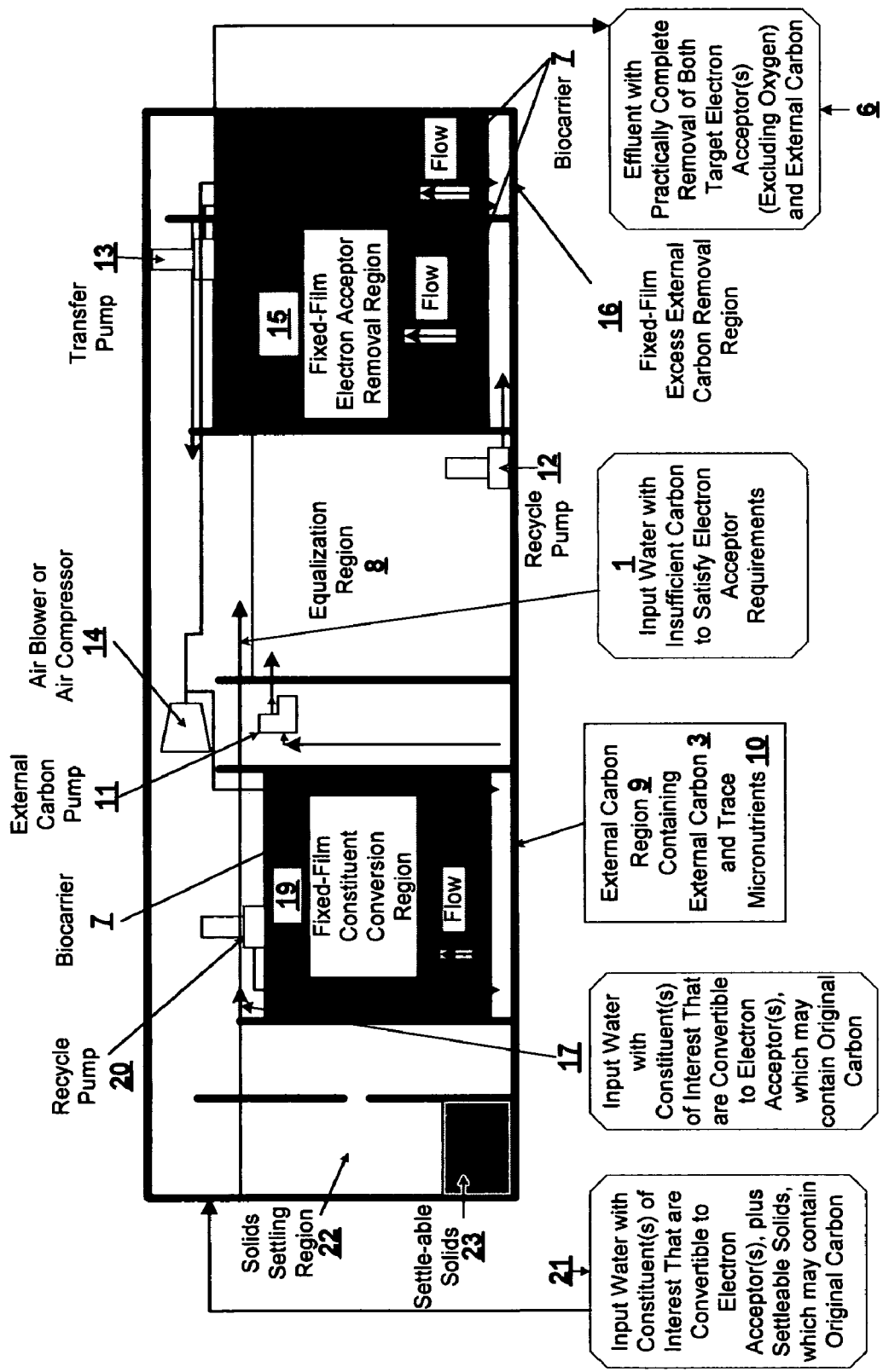
FIG. 8 is a process flow diagram of another embodiment of the method of FIG. 4.

FIG. 8 is a process flow diagram of another embodiment of the method of FIG. 4 where the input water also contains settle-able solids. The input water with constituent(s) of interest that are convertible to electron acceptor(s) plus settle-able solids—which may contain original carbon 21—enter the solids settling region 22, where the settle-able solids 23 settle and thus can be removed from the water. The product of this step is the input water with constituent(s) of interest that are convertible to electron acceptor(s)—which may contain original carbon 17—which can be transferred to the fixed-film constituent conversion region 19, or to the intake line of the recycle pump 20 that can be used to recycle water within the fixed-film constituent conversion region 19. The constituent(s) of interest are converted to the target electron acceptor(s), and original carbon can be consumed, yielding input water with insufficient carbon to satisfy electron acceptor requirements 1. This water can be transferred to an equalization region 8, where external carbon 3 and trace micronutrients 10 can be pumped from the external carbon region 9 using the external carbon pump 11. A recycle pump 12 can be used to recirculate water between the equalization region 8 and the fixed-film electron acceptor removal region 15. Recycle flow returns to the equalization region 8, while a transfer pump 13 pumps the treated water from the fixed-film electron acceptor removal region 15 to the fixed-film excess external carbon removal region 16. The biocarrier 7 can be located in all three-treatment regions 19, 15, and 16. An air compressor or air blower 14 can be used to increase the dissolved oxygen concentration of treatment regions 19 and 16. Effluent with practically complete removal of both target electron acceptor(s) (excluding oxygen) and external carbon 6 can be produced from the fixed-film excess external carbon removal region 16. The equalization region may be moved further upstream in an additional embodiment, so that it can be used in conjunction with the constituent conversion region instead of the electron acceptor removal region.

Any number of apparatuses can be envisioned and constructed to accomplish the method in accordance with the principles of the present invention. The apparatuses described herein constitute examples, and not limitations, of how the method may be carried out.

An example of an application of the apparatuses of FIG. 7 or 8 is the treatment of domestic wastewater (or septic water) that has not received any treatment, resulting in a water that is high in original carbon, high in ammonia/ammonium and organically-bound nitrogen, low in nitrate, and high in settle-able solids. Often the carbon (as measured by BOD), the nitrogen, and the solids (as measured by total suspended solids (TSS)) must be removed to a given set of effluent criteria. The solids can typically be settled in a septic tank, where the solids remain stored and degrade over time in the bottom of the tank, while the liquid can be discharged to either the environment, or to the next step of the treatment process. Ammonia/ammonium and organically bound nitrogen are not easily directly removed from the water biologically. One method for dealing with this nitrogen is to convert it to primarily nitrate. This can be accomplished using aerobic biological treatment, such as in the first aerobic treatment stage of the method herein. Prior to the conversion of ammonia/ammonium and organically bound nitrogen to nitrate, typically the original carbon in the water must first be removed. This can also be accomplished in the first aerobic treatment step. Once the water has been treated in this first aerobic step, the water that remains is very low in original carbon, high in nitrate, low in solids, and low in other forms of nitrogen. This water can now be amenable to treatment using the remainder of the treatment steps, which comprise the treatment steps of the method of FIG. 1.

Another embodiment in accordance with the principles of the present invention is the addition of a solids settling region in front of any of the previous methods to reduce the influent solids. Another embodiment in accordance with the principles of the present invention is the addition of a solids settling region at the end of any of the previous methods to reduce the effluent solids. Another embodiment in accordance with the principles of the present invention adds solids filtration before any of the previous methods to reduce the influent solids. Another embodiment in accordance with the principles of the present invention adds solids filtration after any of the previous methods to reduce the effluent solids. Another embodiment in accordance with the principles of the present invention adds to any of the previous methods the removal of metals from the water. Another embodiment in accordance with the principles of the present invention adds to any of the previous methods adjustment of the pH of the water.

Another embodiment in accordance with the principles of the present invention adds to any of the previous methods the reduction of compounds using zero valent iron, or the combination of zero valent iron and fibrous organic matter from the water. Another embodiment in accordance with the principles of the present invention adds to any of the previous methods the oxidation of compounds using a chemical oxidant such as metal peroxides, metal oxides, permanganate, hydrogen peroxide, or any other chemical oxidant. Another embodiment in accordance with the principles of the present invention adds to any of the previous methods the disinfection of the water after biological treatment steps have been completed to reduce the quantity of microorganisms in the water. Another embodiment in accordance with the principles of the present invention adds to any of the previous methods the removal of phosphorus from the water.

Finally, an apparatus satisfying the requirements of any of the embodiments may be constructed where the biological treatment consists of activated sludge processes, trickling filters, rotating biological contactors, sequencing batch reactors, fixed-film reactors, fluidized bed reactors, any other type of biological treatment processes or equipment, or any combination of the processes or equipment mentioned.

The methods and apparatuses of the present invention are applicable to all types of water, including but not limited to domestic wastewater (including septic wastewater), industrial wastewater, groundwater, and drinking water, although further treatment may be required after the use of this method for drinking water. The methods and apparatuses of the present invention may be utilized 'on-site' where a method can be applied using an apparatus in close proximity to the source of the water. The methods and apparatuses of the present invention may also be utilized at a centralized facility, where waters can be collected from various sources and treated at a centralized location. The methods and apparatuses of the present invention may be utilized at treatment facilities that can be continuously staffed, partially staffed or never staffed. Given the advantages of being able to add an excess of external carbon, the methods and apparatuses of the present invention are particularly useful for facilities that are partially or never staffed.

An advantage of the present invention relative to the prior art that utilizes an external carbon source is that the present invention allows for a margin of error to be utilized in setting the carbon addition rate since the excess external carbon will be removed in the excess external carbon removal step. Other methods can provide too little carbon resulting in significant concentrations of target electron acceptor(s) in the effluent, or can provide too much carbon resulting in pollution of another type due to its biological oxygen demand.

In addition, in the prior art where water is recycled between electron acceptor removal (typically a denitrification zone) and an aerobic zone (typically a nitrification zone), the aerobic zone generally creates new electron acceptor(s) from other constituents in the water and recycles them to the electron acceptor removal step, and the electron acceptor removal step does not completely eliminate constituents that can potentially be converted to the target electron acceptor(s). If the final effluent comes from the electron acceptor removal step, the final effluent will likely contain significant concentrations of constituents that may be converted to the target electron acceptor(s) once released into the environment. If the final effluent comes from the aerobic zone, then it will likely contain significant concentrations of the target electron acceptor(s). Thus these systems are less capable of achieving very low levels of the target electron acceptor(s) and potentially convertible constituents, whereas the current invention is designed to do so.

The following are non-limiting examples in accordance with the principles of the present invention.

EXAMPLE 1

In a bench-scale test, four columns containing 200 milliliters of biocarrier were initially set up for batch treatment of water with a designed starting concentration of 40 milligrams/liter of nitrate expressed in terms of nitrogen ($NO_3$—N). Trace micronutrients were added to the water to benefit the health of the microorganisms that would develop in the columns. Approximately one liter of water was recirculated between the recycle reservoir and the column. The first column contained no external source of organic carbon. The second, third, and fourth columns were supplemented with a different external carbon source.

Under batch conditions, the control column with no external carbon yielded a final nitrate-nitrogen concentration of 36.5 mg/L, which represented less than 10% reduction. The three columns with the external carbon removed all of the detectable nitrate, where the detection limit of the test itself was 2.5 mg/L. The columns were then placed under continuous feed conditions, where a constant supply of water with nitrate was pumped into the columns, and treated water was continuously removed. After two days of continuous feed treatment, the effluent from the control column without external carbon had a concentration of 39 mg/L. The effluent of the three columns containing the external carbon additives provided complete removal of nitrate to below the detection limit of 2.5 mg/L. The nitrate-nitrogen concentration in the influent after sitting in the laboratory for two days was only 29.3 mg/L, indicating that some of the nitrate in the feed stream was degraded, likely due to natural organic matter present in the water. This test illustrates the ability of the present invention to practically completely remove an electron acceptor.

EXAMPLE 2

In a bench-scale study, an external carbon source was added to water that contained no nitrate, which simulates water from the effluent of an electron acceptor removal region where excess external carbon had been added. This water was passed through a fixed-film treatment column containing biocarrier, and which was aerated underneath the biocarrier bed. The flow rate was set to provide a hydraulic retention time of one hour. The amount of carbon in the system was measured by the biological oxygen demand (BOD). On day 66, the influent soluble BOD was approximately 273 mg/L, while the effluent soluble BOD was not detected (to a detection limit of 6 mg/L). This illustrates the capability of the present invention to practically completely remove the excess external carbon given the appropriate operating conditions.

EXAMPLE 3

In a bench-scale study, the minimum HRT was determined for complete removal of 40 mg/L $NO_3$—N in tap water, supplemented with a specific composition of micro- and macronutrients. A 200-mL fixed-film reactor filled with biocarrier was utilized for this study. Given that there was no natural source of organic carbon in the water, carbon was added through the addition of methanol at a controlled rate. The amount of biomass in the column was controlled through daily sparging of air through the column. This action maintained a high level of biomass in the column, while preventing plugging of the reactor. Initially, minimization of the HRT was investigated. The HRT was initially two hours, and was systematically decreased to one hour, 30 minutes, and finally 15 minutes. After achieving denitrification of the artificial wastewater stream to below detection levels for an extended period of time at the lowest HRT of 15 minutes, the methanol addition rate was optimized. Prior to this point, methanol was added in excess to ensure the organic carbon was not limiting the process. The methanol dosage was reduced, and this resulted in very low nitrate levels (less than the detection limit of 5 mg/L) in combination with very low effluent biological oxygen demand (BOD) levels (less than the detection limit of 6 mg/L) and very low total suspended solids (TSS) levels (less than 10 mg/L). This test illustrates the ability of the present invention to practically completely remove an electron acceptor and external carbon while operating at a very low HRT.

EXAMPLE 4

In a bench-scale study, three columns were constructed, containing 200 mL of an inorganic biocarrier. The columns were operated using a hydraulic retention time of 4 hours, with recycling of flow and no aeration. Three different sources of carbon were evaluated: acetic acid, methanol, and a fibrous organic material. The influent water was spiked with 1,200 parts per billion (ppb) of perchlorate. The effluent of all of the columns was not detected (detection limits varied from 40 to 80 ppb). This test illustrated the ability of the present invention to remove perchlorate from water.

While the invention has been described with specific embodiments, other alternatives, modifications and variations will be apparent to those skilled in the art. Accordingly, it will be intended to include all such alternatives, modifications and variations set forth within the spirit and scope of the appended claims.

What is claimed is:

1. A method of treating a water comprising one or more electron acceptor(s) that are targeted for changing to another form and insufficient carbon to allow biological treatment methods to completely remove the electron acceptor(s), the method comprising:
   providing a region of biological treatment that contains microorganisms that remove the target electron acceptor(s);
   adding to the water an external carbon source in a manner that ensures the carbon source is present in the electron acceptor removal region in a quantity that is in excess of that required to remove the electron acceptor(s);
   providing a region of biological treatment that contains microorganisms that remove the excess external carbon source from the water; and
   adding a material or providing a process that causes the addition of dissolved oxygen to the water in a manner that ensures dissolved oxygen is present in the excess external carbon removal region in a quantity that is in excess of that required to remove the excess external carbon.

2. The water treatment method of claim 1 further including adding the external carbon source in or upstream of the electron acceptor removal region.

3. The water treatment method of claim 1 further including adding the material or providing the process that causes the addition of dissolved oxygen in or upstream of the excess external carbon removal region.

4. The water treatment method of claim 1 further including estimating the external carbon initial concentration by balancing the chemical reaction between the external carbon source and the electron acceptor(s).

5. The water treatment method of claim 4 further including approximating the concentration of the external carbon source required in the water as the sum of the multiplication of the mass concentration of each electron acceptor by the mass ratio of the carbon source to the given electron acceptor.

6. The water treatment method of claim 1 further including increasing the external carbon on-going concentration if the concentration(s) of the electron acceptor(s) measured after the electron acceptor removal region are in excess of the concentration(s) desired.

7. The water treatment method of claim 1 further including decreasing the external carbon on-going concentration if the concentration of the excess carbon measured after the excess carbon removal region is in excess of the concentration desired.

8. The water treatment method of claim 7 further including indirectly measuring the concentration of the excess carbon.

9. The water treatment method of claim 8 further including measuring the concentration of the excess carbon as the biological oxygen demand.

10. The water treatment method of claim 1 further including the addition of trace micronutrients to improve the health and viability of the microorganisms.

11. The water treatment method of claim 1 further including removing settleable solids.

12. The water treatment method of claim 1 further including filtering solids.

13. The water treatment method of claim 1 further including removing metals from the water.

14. The water treatment method of claim 1 further including adjusting the pH of the water.

15. The water treatment method of claim 1 further including reducing chlorinated compounds using reduced or zero valence metal(s).

16. The water treatment method of claim 15 further including reducing chlorinated compounds using the combination of reduced or zero valence metal(s) and fibrous organic carbon.

17. The water treatment method of claim 1 further including oxidizing constituent(s) of interest using a chemical oxidant.

18. The water treatment method of claim 17 further including selecting the chemical oxidant from the group comprising metal peroxides, metal oxides, permanganate, hydrogen peroxide, any other chemical oxidant, and combinations thereof.

19. The water treatment method of claim 1 further including disinfecting the water to reduce the quantity of microorganisms in the water after biological treatment steps are complete.

20. The water treatment method of claim 1 further including removing phosphorus.

21. The water treatment method of claim 1 further including selecting the biological treatment from the group comprising activated sludge processes, trickling filters, rotating biological contactors, sequencing batch reactors, fixed-film reactors, fluidized bed reactors, any other type of biological treatment processes or equipment, and combinations thereof.

22. The water treatment method of claim 1 further wherein the regions are tanks.

23. A method of treating a water that contains one or more constituent(s) of interest that must be removed from the water that must first be converted to a target electron acceptor(s) by an aerobic biological treatment process prior to their final removal via biological treatment and which may contain original carbon, the method comprising:
   providing a region of biological treatment that contains microorganisms that convert the constituent(s) of interest to the target electron acceptor(s) and may consume original carbon present in the water;
   adding a material or providing a process that causes the addition of dissolved oxygen to the water in a manner that ensures dissolved oxygen is present in the constituent conversion region in a quantity that is in excess of that required to at least convert the constituent(s) of interest to the target electron acceptor(s) if not also consume any original carbon;

providing a region of biological treatment that contains microorganisms that remove the target electron acceptor(s);

adding to the water an external carbon source in a manner that ensures the carbon source is present in the electron acceptor removal region in a quantity that is in excess of that required to remove the electron acceptor(s);

providing a region of biological treatment that contains microorganisms that remove the excess external carbon source from the water; and adding a material or providing a process that causes the addition of dissolved oxygen to the water in a manner that ensures dissolved oxygen is present in the excess external carbon removal region in a quantity that is in excess of that required to remove the excess external carbon.

24. The water treatment method of claim 23 further including adding the material or process that causes the addition of dissolved oxygen in or upstream of the constituent conversion region.

25. The water treatment method of claim 23 further including adding the external carbon source in or upstream of the electron acceptor removal region.

26. The water treatment method of claim 23 further including adding the material or process that causes the addition of dissolved oxygen in or upstream of the external carbon removal region.

27. The water treatment method of claim 23 further including estimating the external carbon initial concentration by balancing the chemical reaction between the external carbon source and the electron acceptor(s).

28. The water treatment method of claim 27 further including approximating the concentration of the external carbon source required in the water as the sum of the multiplication of the mass concentration of each electron acceptor by the mass ratio of the carbon source to the given electron acceptor.

29. The water treatment method of claim 23 further including increasing the external carbon on-going concentration if the concentration(s) of the electron acceptor(s) measured after the electron acceptor removal region are in excess of the concentration(s) desired.

30. The water treatment method of claim 23 further including decreasing the external carbon on-going concentration if the concentration of the excess carbon measured after the excess carbon removal region is in excess of the concentration desired.

31. The water treatment method of claim 30 further including indirectly measuring the concentration of the excess carbon.

32. The water treatment method of claim 31 further including measuring the concentration of the excess carbon as the biological oxygen demand.

33. The water treatment method of claim 23 further including the addition of trace micronutrients to improve the health and viability of the microorganisms.

34. The water treatment method of claim 23 further including removing settleable solids.

35. The water treatment method of claim 23 further including filtering solids.

36. The water treatment method of claim 23 further including removing metals from the water.

37. The water treatment method of claim 23 further including adjusting the pH of the water.

38. The water treatment method of claim 23 further including reducing chlorinated compounds using reduced or zero valence metal(s).

39. The water treatment method of claim 38 further including reducing chlorinated compounds using the combination of reduced or zero valence metal(s) and fibrous organic carbon.

40. The water treatment method of claim 23 further including oxidizing constituent(s) of interest using a chemical oxidant.

41. The water treatment method of claim 40 further including selecting the chemical oxidant from the group comprising metal peroxides, metal oxides, permanganate, hydrogen peroxide, any other chemical oxidant, and combinations thereof.

42. The water treatment method of claim 23 further including disinfecting the water to reduce the quantity of microorganisms in the water after biological treatment steps are complete.

43. The water treatment method of claim 23 further including removing phosphorus.

44. The water treatment method of claim 23 further including selecting the biological treatment from the group comprising activated sludge processes, trickling filters, rotating biological contactors, sequencing batch reactors, fixed-film reactors, fluidized bed reactors, any other type of biological treatment processes or equipment, and combinations thereof.

45. The water treatment method of claim 23 further wherein the regions are tanks.

* * * * *